United States Patent Office 2,824,874
Patented Feb. 25, 1958

2,824,874

RESERPIC ACID AND DERIVATIVES

Emil Schlittler, Madison, N. J.

No Drawing. Application August 5, 1955
Serial No. 526,780

11 Claims. (Cl. 260—286)

This application is a continuation-in-part of my co-pending applications Serial No. 353,920, filed May 8, 1953, now abandoned; Serial No. 361,879, filed June 15, 1953, now abandoned; Serial No. 373,461, filed August 10, 1953, now abandoned; and Serial No. 376,984, filed August 27, 1953, now abandoned.

This invention relates to the degradation of an alkaloid isolated from plants of the Rauwolfia species to form a new acid and the preparation of its esters and salts.

From investigations I made jointly with J. Mueller and H. J. Bein, it is known that from *Rauwolfia serpentina* Benth an alkaloid having sedative action can be isolated in pure form which is called reserpine [Experientia, volume VIII, page 338 (1952)]. Reserpine also has a pronounced hypotensive action and is of great therapeutic importance. The process of its preparation is described in U. S. patent application Serial No. 367,357, now Patent No. 2,752,381, filed by E. Schlittler and J. Mueller on July 10, 1953. Nothing has hitherto become known about the constitution of reserpine.

I have now made the unexpected observation that when reserpine is treated with certain agents described below a new carboxylic acid is obtained. I have given it the name reserpic acid. My investigations have shown that in addition to the free carboxyl group reserpic acid has a free hydroxyl group and can be represented by the formula:

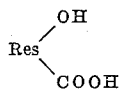

wherein Res stands for the divalent organic radical bound to the free hydroxyl and carboxyl groups in the reserpic acid. My investigations have further disclosed the fact that by conversion of the carboxyl group into a carbomethoxy group, and the hydroxyl group into a 3,4,5-trimethoxy-benzoyloxy group, the reserpic acid can be reconverted into reserpine so that the constitution:

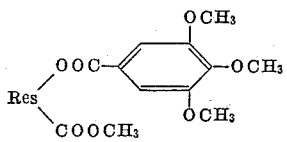

can be attributed to the latter.

Reserpic acid has the following physical characteristics: Melting point 239–245° C. Ultraviolet spectrum (in ethanol), maxima at λ=224 mμ (ε=31,000); 270 mμ (ε=5,040); 294 mμ (ε=6,520). Minima at λ=250 mμ (ε=3,440); 280 mμ (ε=4,210). Infrared spectrum (in "Nujol"), absorption bands at 3520–3480 (incline), 3240 (broad band), 2900, 2850 (broad band), 1625, 1605–1585 (broad band), 1570, 1505, 1465, 1395, 1378, 1365, 1317, 1280, 1242, 1221 (flat), 1201, 1163, 1140, 1108, 1078, 1028, 973, 950, 905, 804, 750, 720.

Analysis gives the following values in percent: C=65.66; H=7.33; N=6.98, empirical formula, $$C_{22}H_{28}O_5N_2$$

In addition to the preparation of reserpic acid of the formula:

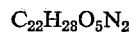
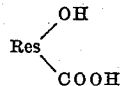

the invention embraces the preparation of the esters of such acid in which at least the carboxyl group is esterified, and the salts, and the quaternary ammonium compounds thereof. Besides reserpic acid the invention particularly embraces the preparation of those esters in which the carboxyl group is esterified with an alkanol, preferably a lower alkanol, such as ethanol, propanol, butanol, and above all methanol, and in which the hydroxyl group is free or esterified by a carboxylic or sulfonic acid. The preferred acids are carboxylic acids of the aliphatic, araliphatic, heterocyclic or aromatic series, above all, benzoic acids whose phenyl radicals are substituted by etherified hydroxyl groups, especially lower alkoxy groups, or halogen atoms, primarily methoxy-benzoic acids, such as 3,4-dimethoxy-benzoic acid, 4-methoxy-benzoic acid, especially 3,4,5-trimethoxy-benzoic and piperonylic acid. Further acids are primarily cinnamic acid, or dichlorobenzoic acids, phenyl acetic acid, furane carboxylic acids, such as furane-2-carboxylic acid, pyridine-carboxylic acids, such as pyridine-3-carboxylic acid, lower fatty acids, e. g. acetic acid or isocapronic acid. Especially valuable are esters of reserpic acid of the formula:

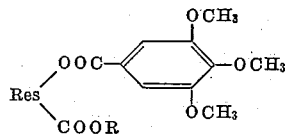

wherein R stands for a lower alkyl radical, above all methyl.

Reserpic acid and its esters, in which at least the carboxyl group is esterified and, if the hydroxyl group is esterified with 3,4,5-trimethoxy-benzoic acid, the esterified carboxyl group contains more than two carbon atoms and salts of the said compounds are new, and so are the quaternary ammonium compounds of reserpic acid and the esters thereof.

The compounds of this invention which have a free hydroxyl group can be used as intermediate products in the manufacture of medicaments; those in which both functional groups are esterified have, like reserpine, valuable pharmacological properties and can be used as medicaments. Thus, for example, the following compounds exhibit reserpine-like, i. e. sedative and hypotensive activity: methyl reserpate veratrate, methyl reserpate anisate, methyl reserpate furoate, methyl reserpate nicotinate, methyl reserpate cinnamate, methyl reserpate acetate, and ethyl reserpate 3,4,5-trimethoxy-benzoate. Of outstanding reserpine-like activity is especially methyl reserpate 3,4-methylenedioxy-benzoate.

The first stage of the process of this invention for the preparation of said compounds comprises subjecting reserpine to the action of an alkaline saponifying medium.

Depending on the procedure which is followed, it is possible to split both ester groups or to saponify reserpine partially, splitting but the esterified hydroxyl group. To achieve one or the other end, one may work with different alkaline saponifying agents or with the same but under different conditions, as e. g. in the presence or absence of water, at a lower or higher temperature or for a longer or shorter period of time. For example, when reserpine is heated for a comparatively long time with the solution of an alkali hydroxide, such as potassium hydroxide, in an alcohol, such as methanol, both ester groups are hydrolyzed. When the treatment is performed with the same agent under milder conditions, e. g. for a short time only, only the esterified hydroxyl group is split.

For partial saponification, however, there is used as alkaline saponifying agent especially one capable of converting an esterified hydroxyl group into a free hydroxyl group with the formation of an ester, that is to say, by alcoholysis, the carbomethoxy group being re-esterified, depending on the conditions employed. This procedure is described in application Serial No. 376,523, filed August 25, 1953, by Harold B. MacPhillamy and Charles F. Huebner. It is thus of advantage to work in an anhydrous alcohol in the presence of an alcoholate, such as an alkali metal or aluminum alcoholate or some other alcoholizing agent, such as sodium carbonate or piperidine. In absolute methanol in the presence of e. g. an alkali methylate, such as sodium methylate or aluminum tertiary butylate, piperidine or sodium carbonate, there is formed the reserpic acid methyl ester. When the alcoholysis is carried out in other absolute alcohols, such as ethanol or butanol in the presence, for example, of the corresponding alcoholates, such as e. g. sodium ethylate or sodium butylate or other alcoholizing agents there are obtained by re-esterification the corresponding reserpic acid esters, such as reserpic acid ethyl ester or butyl ester. The products of this process are isolated by known methods. For conversion into reserpic acid, the esters can be further treated in an alkaline medium, e. g. with an alkaline solution of an alkali hydroxide such as a methanolic solution of potassium hydroxide.

Reserpic acid esters with a free hydroxyl group can also be obtained by treating reserpic acid with an esterifying agent capable of converting a carboxyl group into an esterified carboxyl group. To this end the reserpic acid can be converted into an ester thereof either directly or by way of a functional derivative thereof. Advantageously reserpic acid is reacted with a diazo alkane or it is esterified with an alcohol, especially an alkanol, in the presence of a strong acid, such as a hydrohalic acid.

To prepare an ester of the reserpic acid of which both functional groups are esterified, a reserpic acid ester with a free hydroxyl group is treated with an esterifying agent capable of converting a hydroxyl group into an esterified hydroxyl group. One procedure is to react an ester with a free hydroxyl group with the desired acid advantageously in the form of a reactive functional derivative thereof, especially a halide, such for example, as the chloride, or an anhydride. The reaction is advantageously conducted in the presence of a diluent and/or a condensing agent. When an acid halide is used it is advantageous to work in an anhydrous solvent in the presence of an acid-binding agent, such as an alkali carbonate or alkaline earth carbonate or a strong organic base, such as a tertiary amine. There may be used, e. g. an acid halide in pyridine as solvent.

Depending on the method of working, reserpic acid and its esters are obtained in the free form or as salts. Since reserpic acid, in addition to the carboxyl group, contains a basic group, it can form salts with bases or acids. It is possible to prepare from reserpic acid e. g. by reaction with a metal hydroxide, a metal salt, e. g. an alkali metal salt. On the other hand, reserpic acid and its esters can be converted into their salts with acids, for example, by treating them with inorganic or organic acids, such as hydrohalic acids, sulfuric acid, phosphoric acid, nitric acid, hydroxyethane sulfonic acid, toluene sulfonic acid, acetic acid, tartaric acid, or citric acid. From the salts, reserpic acid and its esters can be obtained in the free form. There is obtained, for example, from reserpic acid hydrochloride by reaction with silver carbonate the free reserpic acid. From reserpic acid and esters thereof can be obtained by treatment with quaternizing agents the quaternary ammonium salts, as e. g. by reaction with reactive esters of lower alkanols, e. g. alkylhalides, dialkyl sulfates or the alkyl esters of organic sulfonic acids, such as the toluene sulfonic acids.

In the afore-described reactions, the starting materials can also be used in the form of the salts mentioned. Thus it is possible, e. g. to react reserpic acid in th form of its hydrochloride with a diazo alkane. Instead of reserpine, material containing reserpine can be used as starting material, such as an extract from plant material of the Rauwolfia species, e. g. of *Rauwolfia serpentina* Benth.

The invention includes also a modification of the process which comprises using as starting material a compound obtainable as intermediate product at any stage of the process and carrying out the remaining process steps.

The following examples will serve to illustrate the invention. The relationship of parts by weight to parts by volume being the same as the gram to the milliliter.

*Example 1*

One part by weight of reserpine is refluxed with 40 parts by volume of N methanolic KOH, under nitrogen for 1½ hours. The solution is cooled, adjusted to pH 1-2 with 1:1 HCl (6 N HCl), and filtered to remove KCl. The filtrate is evaporaetd almost to dryness, slurried with two 25 parts by volume portions of ether and partially dissolved in 25 parts by volume of methanol. The methanol is evaporated almost to dryness and the residue again extracted with two 25 parts by volume portions of ether. The solid remaining is dissolved in 50 parts by volume of methanol, adjusted with N methanolic KOH to about pH 6 and evaporated almost to dryness. Addition of 50 parts by volume of chloroform dissolves the bulk of the solid, leaving KCl. Evaporation of the chloroform extract leaves crude reserpic acid which crystallizes on the addition of a small amount of methanol and warming in a water bath. Ether is added dropwise to complete the crystallization and the crystals filtered and washed with ether. The reserpic acid thus obtained in the form of the hydrochloride melts at 255–258° C. It has the empirical formula: $C_{22}H_{28}O_5N_2 \cdot HCl$. The hydrochloride is very soluble in water, substantially insoluble in dry chloroform and moderately soluble in methanol-chloroform. It has optical rotaitons: $[\alpha]_D^{25} = -75°$ (1% $H_2O$) and $[\alpha]D = -80 \pm 3°$ ($CHCl_3$). The compound analyzes as follows in percent: C=59.59; H=7.06; N=6.2; Cl=8.12; O=19.03 (by difference). The compound exhibits characteristic absorption bands in the infrared region of the spectrum when suspended in solid form in a hydrocarbon oil (Nujol) at the following frequencies expressed in reciprocal centimeters: 3450 (broad band), 3225, 2915 (broad band), 2850–2880 (flat), 2585 (broad band), 1685, 1630, 1605, 1578, 1511, 1482, 1465, 1450, 1405, 1370, 1350, 1335, 1310, 1290, 1265, 1250, 1230, 1205, 1160, 1145, 1090, 1075, 1055, 1020, 980, 950, 900, 870, 840, 820, 780, 755, 712, 675 and 625. The chart headed "Infrared absorption spectrum of reserpic acid hydrochloride," in my patent application Serial No. 353,920, shows the infrared absorption curve with the aforementioned bands. The frequencies are indicated at the top of each curve. The vertical series of numbers (0 to 100) designates "percentage transmission."

In ethanol, reserpic acid hydrochloride exhibits absorption bands in the ultra-violet region of the spectrum having maxima at 222 m$\mu$($\epsilon$=33,330), 268 m$\mu$($\epsilon$=5150), 294 m$\mu$($\epsilon$=6776); and maxima at 248 m$\mu$($\epsilon$=2942) and 278 m$\mu$($\epsilon$=4146).

Reserpic acid hydrochloride can be converted to the free acid as follows:

0.1 part by weight of reserpic acid hydrochloride is dissolved in 10 parts by volume of methanol and stirred with 0.125 part of powdered silver carbonate for 10 minutes. The solution is filtered to remove excess silver carbonate and the silver chloride formed, and the filtrate evaporated to dryness, whereupon a pale yellow solid is obtained. Recrystallization from 1–2 parts by volume of methanol yields almost colorless crystals of reserpic acid, M. P. 239–245° C. Analysis: C=65.66, H=7.33, N=6.98, O=20.03 (by difference). Reserpic acid contains both a hydroxyl group and a carboxyl group.

In ethanol the free reserpic acid exhibits absorption bands in the ultra-violet region of the spectrum having maxima at 224 m$\mu$($\epsilon$=31,000), 270 m$\mu$($\epsilon$=5,040), 294 m$\mu$($\epsilon$=6,520); and minima at 250 m$\mu$($\epsilon$=3,440) and 280 m$\mu$($\epsilon$=4,210).

The free reserpic acid exhibits characteristic absorption bands in the infrared region of the spectrum when suspended in solid form in a hydrocarbon oil (Nujol) at the following frequencies expressed in reciprocal centimeters: 3520–3480 (incline), 3240 (broad band), 2900, 2850 (broad band) 1625, 1605–1585 (broad band), 1570, 1505, 1465, 1395, 1378, 1365, 1317, 1280, 1242, 1221 (flat), 1201, 1163, 1140, 1108, 1078, 1028, 973, 950, 905, 829, 804, 750, 720.

The chart headed "Infrared absorption spectrum of reserpic acid," in my patent application Serial No. 361,879, shows the infrared absorption curve with the aforementioned bands. The frequencies are indicated at the top of each curve. The vertical series of numbers (0 to 100) designates "percentage transmission."

The reserpic acid can be converted to the hydrochloride as illustrated by the following example:

0.1 part by weight of reserpic acid is slurried in 5 parts by volume of methanol and the pH adjusted to 3–4 by adding several drops of 1:1 HCl. The resulting solution is concentrated in vacuo to a small volume, whereupon white crystals are formed. After standing a few minutes, the crystals are filtered off. The reserpic acid hydrochloride thus obtained melted at 257–260° C. The mother liquor, on standing, yielded further crystals of reserpic acid hydrochloride.

The free reserpic acid may also be converted into metal salts, for example, the alkali metal salts, as illustrated by the following example:

0.1 part by weight of reserpic acid is mixed with 0.25 part by volume of N methanolic KOH. The solution thus obtained is filtered, and the filter washed with 1 part by volume of methanol. To the filtrate is added 25 parts by volume of ether, whereupon potassium reserpate precipitates as a white powder. The salt is collected on a filter and washed once with 5 parts by volume of ether and dried. The salt begins to char at above 200° C., is black at 250° C., and melts at 270–300° C.

Alkaline earth metal salts, e. g. barium and calcium salts can be prepared in a similar manner by employing the appropriate alkaline earth metal bases.

The reserpine employed as the starting material in Example 1 can be prepared as described in the applications of myself and Johannes Mueller, each filed in Switzerland on July 24, 1952, and entitled Process for the Production of a Sedative Acting Material, U. S. patent application Serial No. 367,357, filed July 10, 1953, now Patent No. 2,752,351. The following illustrates the process:

7,000 parts by weight of powdered bark obtained from the roots of Rauwolfia serpentina Benth are percolated with 35,000 parts by volume of methanol. After evaporating the methanol extract, 1,050 parts of a dark colored powder are obtained, which is treated with water repeatedly. The remaining insoluble residue is then treated five times, each time with 1,500 parts by volume of 10% aqueous acetic acid and the solution separated from the oily portion by centrifugation. The brown acetic acid solution is either concentrated at low temperature or diluted with half of its volume of water and then has a pH of about 3.9. This solution is extracted with a total of 3,500 to 4,000 parts by volume of chloroform divided into 3 to 4 portions. The chloroform extracts are washed once with potassium carbonate solution and twice with water, then dried with sodium sulfate and completely evaporated in vacuum. The residue of 70 to 80 parts by weight is a green-brown colored powder. For further processing, this residue is dissolved in benzene and chromatographed on 1,000 to 1,200 parts by weight of neutral aluminum oxide (activity II–III according to the Brockmann standard). By eluting with benzene a small amount of a yellow oil is obtained first and afterwards 0.9 part by weight of a physiologically inactive crystalline material with a M. P. of 238–9° C. and then the sedatively active component follows. As soon as the main part of the active component is eluted, the chromatographic column is then further eluted with a mixture of 2 parts by volume of benzene and 1 part by volume of acetone. By doing so the remainder of the sedative principle is eluted and then physiologically inactive crystalline material with a M. P. 141–143° C. follows. The fractions which contain the sedative factor are evaporated to dryness. By recrystallizing the residue from hot acetone or a mixture of chloroform and ether, 6.5 to 7 parts of residue (reserpine) are obtained in almost colorless crystals melting at 262–263° C. (with decomposition) and with a rotation $$[\alpha]D = -117°$$

(chloroform).

*Example 2*

A mixture of 34.8 parts by weight of reserpine, 0.30 part by weight of sodium hydrosulfite and 1,392 parts by volume of N methanolic KOH are refluxed under nitrogen for 1.5 hours. The resulting light amber colored solution is adjusted to pH 1–2 with 255 parts by volume of 1:1 HCl and is filtered to remove KCl. The filtrate is evaporated in vacuo under nitrogen on a water bath at a temperature of 45–50° C. to a semi-solid paste. This paste is extracted with two 750 parts by volume portions of freshly distilled ether. The residue is partly redissolved in 750 parts by volume of methanol and again evaporated in vacuo to a pasty solid. It is extracted with three 750 parts by volume portions and two 150 parts by volume portions of ether. The pasty residue is slurried with 750 parts by volume of a 6:1 chloroform-methanol mixture, and the pH is adjusted to 5–6 with N methanolic KOH. The resulting solution is filtered from KCl and evaporated in vacuo under nitrogen to dryness using a water bath at 50° C. The residue is again slurried with 750 parts by volume of the aforesaid chloroform-methanol mixture, and the solid filtered off and washed with two parts by volume portions of the same solvent mixture. The solid is dried and is free reserpic acid. The filtrate is evaporated to a tan viscous residue which crystallizes on addition of 5–10 parts by volume of methanol and gentle warming. Addition of 250 parts by volume of ether resulted in precipitation of more crystals. The crystals are filtered and washed. 0.5 part by weight of the crystals is slurried in 10 parts by volume of methanol and filtered. The white solid thus recovered is free reserpic acid. Upon concentrating the filtrate, slightly yellow crystals of reserpic acid hydrochloride were obtained.

*Example 3*

To a suspension of 1.2 parts by weight of reserpic acid hydrochloride in 50 parts by volume of 50% ether-methanol is added an excess of an ethereal solution of diazomethane. Nitrogen is evolved and most of the material gradually goes into solution. The reaction mixture is allowed to stand about 18 hours at room temperature and then the excess diazomethane is removed by distillation. The resulting solution is filtered and concentrated to dryness in vacuo at not over 40° C. The crystalline residue is recrystallized from methanol-ether solution and yields methyl reserpate, M. P. 240–242° C. It has the empirical formula $C_{23}H_{30}O_5N_2$ and analyzes in percent as follows: C=66.68; H=7.34; N=7.06;

O=18.92 (by difference); [α]D=—101±3° (CHCl₃). The compound is insoluble in water, soluble in methanol, ethanol and chloroform. In ethanol, it exhibits absorption bands in the ultra-violet region of the spectrum having maxima at 226 mμ(ε=33,830), 270 mμ(ε=5,090), 298 mμ(ε=6,080); and minima at 252–4 mμ(ε=4,110) and 282 mμ(ε=4,070). The compound exhibits characteristic absorption bands in the infrared region of the spectrum when suspended in solid form in a hydrocarbon oil (Nujol) at the following frequencies expressed in reciprocal centimeters: 3510, 3365, 2850–2950 (broad band), 1724, 1632, 1578, 1500, 1465, 1380, 1362, 1355, 1340, 1332, 1312, 1298, 1268, 1245, 1225, 1202, 1155, 1088, 1068, 1055, 1040, 1030, 1020, 1008, 970, 940, 912, 890, 860, 848, 835, 785, 770, 753, 720, 710, 655 and 625.

The chart headed "Infrared absorption spectrum of methyl reserpinate," (now called methyl reserpate), in my patent application Serial No. 353,920, shows the infrared absorption curve with the aforementioned characteristic bands. The frequencies are indicated at the top of each curve. The vertical series of numbers (0 to 100) designates "percentage transmission."

*Example 4*

0.267 part by weight of reserpic acid is suspended in 25 parts by volume of methanol to which has been added 2 drops of water. 30 parts by volume of an ethereal solution containing 0.57 part by weight of diazomethane are added and the reaction mixture allowed to stand at room temperature for about 24 hours. The excess diazomethane and part of the ether are evaporated under nitrogen, and the solution further evaporated to a yellow oil in vacuo. On standing, this crystallized to a solid cake. On recrystallization from methanol, methyl reserpate (reserpic acid methyl ester) is obtained.

*Example 5*

0.2 part by weight of reserpic acid is suspended in 10 parts by volume of methanol and 300 parts by volume of an ethyl ether solution containing 0.5 part by weight of diazoethane added thereto in small portions. The reaction mixture is allowed to stand for about 16 hours at room temperature. The ether and diazoethane are then evaporated off under nitrogen and the methanol solution evaporated almost to dryness. Ether is added and the mixture filtered. The methanol-ether filtrate is evaporated to dryness in vacuo. The glassy residue comprises ethyl reserpate (reserpic acid ethyl ester).

*Example 6*

A solution of approximately 1.2 parts by weight of diazoethane in 230 parts by volume of ether were added to a solution of 4.0 parts by weight of reserpic acid hydrochloride in 75 parts by volume of ethanol and allowed to stand overnight at room temperature. The excess diazoethane was removed by bubbling nitrogen through the solution which was then concentrated to a syrup in vacuo. Approximately 100 parts by volume of ethyl acetate were added, the mixture was warmed and a small amount of insoluble residue filtered off. Evaporation of the ethyl acetate yielded semi-crystalline ethyl reserpate. After recrystallization from acetone, it melted at 220–225° C.

In a similar manner, there may be prepared other esters of reserpic acid, e. g. the propyl and butyl esters from the corresponding diazoalkanes. Instead of employing diazoalkanes, the alcohols in the presence of an acid catalyst such as hydrochloric acid may be employed to esterify the reserpic acid. The esterifying agents may be employed in equivalent amounts or in excess.

*Example 7*

1 part by weight of reserpine is heated to the boil for two hours together with 20 parts by volume of absolute methanol, 0.5 part by weight of KOH and a trace of sodium bisulfite in an atmosphere of nitrogen. A clear yellow-brown solution is formed. This solution is acidified with concentrated HCl to pH 2 and the precipitated KCl is removed by filtration. The solvent is evaporated under reduced pressure, the residue mixed with water and after a short while the timethoxy benzoic acid which has crystallized out is separated by filtration. The filtrate is rendered alkaline with Na₂CO₃ and extracted with ethyl acetate. It is then concentrated in vacuo and strongly acidified with hydrochloric acid. 0.6 part by weight of reserpic acid hydrochloride crystallizes. The ethyl acetate extracts are dried with Na₂SO₄ and evaporated under reduced pressure. The residue crystallized spontaneously and is recrystallized from ether out of a Soxhlet thimble. The yield is 0.38 part by weight of reserpic acid methyl ester which melts at 240.5–241.5° C. (with decomposition).

*Example 8*

0.3 part by weight of reserpine is covered with 4 parts by volume of a normal solution of sodium hydroxide in methanol and then heated to the boil under reflux. As soon as the substance is dissolved, that is to say after about a quarter of an hour, 15 parts by volume of water and 0.25 part by weight of ammonium chloride are added, and the methanol is distilled off under reduced pressure. The reserpic acid methyl ester crystallizes from the aqueous residue.

*Example 9*

To 50 parts by volume of anhydrous methanol was added 0.1 part by weight of metallic sodium and when the ensuing reaction had ceased, 1.0 part by weight of reserpine was suspended in the solution. The mixture was refluxed for three hours during which time the material gradually dissolved. The solution was then concentrated in vacuo at 40–50° C. to about 15 parts by volume and 50 parts by volume of water were then added. The pH of the solution was adjusted to 4.5–5 by the addition of 10% sulfuric acid. The resulting acid solution was extracted three times with 50 parts by volume portions of ether. The aqueous phase was then made alkaline with concentrated ammonia and the precipitated material taken up in chloroform. The chloroform solution was washed with water, dried and the solvent removed. The resulting oil crystallized and was identified as methyl reserpate. It melted at 236–238° C. after recrystallization from ethyl acetate.

*Example 10*

By following the same procedure as in Example 9 and using the same amounts of reagents, but employing dry ethanol, there is obtained an oily material comprising ethyl reserpate.

*Example 11*

By following the same procedure as in Example 9 and using the same amounts of reagents but employing dry butanol, there is obtained an oily material comprising butyl reserpate.

*Example 12*

A suspension of 1 part by weight of reserpine in 50 parts by volume of absolute methanol containing 6 drops of dried piperidine was refluxed 10 hours. The solution was cooled and filtered, the filtrate concentrated to 15 parts by volume, diluted with 50 parts by volume of water, and its pH adjusted to 4.5–5 by the addition of sulfuric acid. It was then extracted with ether and the aqueous phase was then made alkaline with concentrated ammonium hydroxide and extracted with chloroform. The chloroform extract was washed until neutral, dried, and concentrated. The resulting oil crystallized upon the addition of a small amount of methanol and yielded methyl reseapate.

*Example 13*

A suspension of 1 part by weight of reserpine and 0.1 part by weight of aluminum tertiary butoxide in 50 parts by volume of absolute methanol was refluxed 12 hours. It was then cooled and filtered. The filtrate was concentrated to 15 parts by volume, diluted with 50 parts by volume of water, its pH adjusted to 4.5–5 by the addition of sulfuric acid, and extracted with ether. The aqueous phase was then made alkaline with concentrated ammonium hydroxide and extracted with chloroform. The chloroform extract was washed until neutral, dried and concentrated. The resulting oil crystallized upon the addition of a small amount of methanol and yielded methyl reserpate.

*Example 14*

A suspension of 1 part by weight of reserpine and 0.1 part by weight of sodium carbonate in 50 parts by volume of absolute methanol was refluxed 6 hours. It was then cooled and filtered. The filtrate was concentrated to 15 parts by volume, diluted with 50 parts by volume of water, its pH adjusted to 4.5–5 by the addition of sulfuric acid, and extracted with ether. The aqueous phase was made alkaline with concentrated ammonium hydroxide and extracted with chloroform. The chloroform extract was washed until neutral, dried and concentrated. The resulting oil crystallized upon the addition of a small amount of methanol and yielded methyl reserpate.

*Example 15*

To a solution of 0.1 part by weight of methyl reserpate in 2 parts by volume of dry pyridine are added slowly with cooling 2 parts by volume of a pyridine solution containing 0.260 part by weight of 3,4,5-trimethoxybenzoyl chloride. The reaction mixture is allowed to stand at room temperature for 66 hours. At the end of that time 20 parts by volume of water are slowly added and the resulting solution distilled to dryness in vacuo at 40° C. The residue is taken up in chloroform and washed successively with water, 1% aqueous sodium hydroxide solution and water. After drying, the solvent is removed in vacuo at 40° C. leaving a semi-crystalline residue. Upon recrystallization from acetone a substance is obtained melting at 264–266° C. (with decomposition). A mixture of this substance with the starting material, reserpine, melted at 263–265° C. Its infrared spectrum coincided with that of reserpine.

*Example 16*

A solution of 0.5 part by weight of methyl reserpate and 1.5 parts by weight of 3,4,5-trimethoxybenzoyl chloride in 15 parts by volume of pyridine is allowed to stand 4 days at room temperature and then diluted with about 35 parts by weight of ice. The resulting mixture is filtered and the filtrate evaporated to dryness in vacuo under nitrogen on a water bath at 50° C. The solid residue obtained is re-dissolved in 50 parts by volume of chloroform. This is washed in succession with three 50 parts by volume portions of 2% potassium hydroxide solution, one 50 parts by volume portion of 2% hydrochloric acid and finally with 50 parts by volume of water. The chloroform solution, after drying over sodium sulfate, is evaporated to dryness, leaving an amber-colored glassy product. This is dissolved in 10 parts by volume of benzene and chromatographed on a 10 parts by weight column of II–III grade alumina. Eluates of approximately 50 parts by volume each of benzene, 90 benzene:10 acetone, 60 benzene:40 acetone, and acetone are removed and the eluates evaporated to oily residues. A tarry product is recovered in the benzene eluate. From the other eluates, after triturating with a few drops of methanol, reserpine is recovered.

*Example 17*

A solution of 0.5 part by weight of methyl reserpate and 1.5 parts by weight of veratroyl chloride in 15 parts by volume of pyridine was allowed to stand for 5 days at room temperature and then diluted with approximately 25 parts by weight of ice. The solution was then evaporated to dryness in vacuo under nitrogen, at 50° C. and the resulting glassy solid then dissolved in 50 parts by volume of chloroform. The resulting solution was washed in succession with three 50 parts by volume portions of 2% hydrochloric acid, three 50 parts by volume portions of 2% potassium hydroxide solution, one 50 parts by volume portion of 2% hydrochloric acid and finally with 50 parts by volume of water. The chloroform solution after drying over sodium sulfate was evaporated to dryness leaving an amber glassy-like material. This was dissolved in 10 parts by volume of benzene and chromatographed on a 10 parts by weight column of alumina (Brockmann activity, II–III). Eluates of approximately 50 parts by volume each of benzene, 90 benzene:10 acetone, 60 benzene:40 acetone and 100 parts by volume of acetone were removed and evaporated to oily residues. A tarry product was removed in the benzene eluate. From the other eluate fractions, after triturating with a few drops of methanol, methyl reserpate veratrate was obtained. On recrystallization from acetone it melted at 230–233° C.

Aanalysis: Theory: C, 66.4; H, 6.6; N, 4.84. Found: C, 66.04; H, 6.55; N, 4.88. The empirical formula for the compound is: $C_{32}H_{38}O_8N_2$.

*Example 18*

A solution of 1.00 part by weight of methyl reserpate and 3.00 parts by weight of anisoyl chloride in 30 parts by volume of pyridine was allowed to stand four days at room temperature and then diluted with approximately 50 parts by weight of ice. A precipitate of anisic acid anhydride which formed was filtered from the mixture. The remaining solution was evaporated to dryness in vacuo under nitrogen at 50° C. and the resulting amber glassy product then dissolved in 50 parts by volume of chloroform. This was washed in succession with three 100 parts by volume portions of 2% hydrochloric acid, three 100 parts by volume portions of 2% potassium hydroxide solution, one 100 parts by volume portion of 2% hydrochloric acid and finally with 100 parts by volume of water. The chloroform solution, after drying over sodium sulfate, was evaporated to dryness, leaving an amber glassy product. This was dissolved in 10 parts by volume of benzene and chromatographed on a 15 parts by weight column of Brockmann activity II–III alumina. Eluates of approximately 100 parts by volume of benzene, 90 benzene:10 acetone, 60 benzene:40 acetone and 200 parts by volume of acetone were removed and evaporated to oily residues. The bulk of tarry product was removed in the benzene eluate, and from the other fractions, which crystallized with the aid of acetone, methyl reserpate anisate was obtained. M. P. 231.5–233.5° C.

Analysis: Theory: C, 67.8; H, 6.6; N, 5.10. Found: C, 67.94; H, 6.49; N, 5.08. The empirical formula for the compound is: $C_{31}H_{36}O_7N_2$.

*Example 19*

A solution of 5 parts by weight of methyl reserpate and 4.6 parts by volume of 2-furoyl chloride in 100 parts by volume of anhydrous pyridine was allowed to stand at 5° C. for two days. Most of the pyridine was removed in vacuo and the residue shaken with 200 parts by volume of ethyl acetate and 40 parts by volume of 5% sodium hydroxide solution. The ethyl acetate phase was then shaken with 40 parts by volume of 5% aqueous hydrochloric acid. The hydrochloride of the methyl reserpate 2 furoate began to crystallize and was filtered after ½ hour. On recrystallization from water it melted at 258–260° C. The ester in the form of its free base was obtained by dissolving methyl reserpate 2-furoate hydrochloride in 20 parts by volume of a warm 1:9 water-acetone mixture and basifying the resulting solution with aqueous ammonia. On addition of water methyl reserpate 2-furoate separated. On recrystallization from acetone-water the free base melted at 240–242° C. (with decomposition). The compound crystallized with ½ molecule of water.

Analysis: Theory: C, 65.0; H, 6.38; N, 5.4. Found: C, 65.02; H, 6.36; N, 5.53. The empirical formula for the compound is: $C_{28}H_{32}N_2O_7 \cdot \frac{1}{2}H_2O$.

Example 20

A solution of 5 parts by weight of methyl reserpate and 5 parts by volume of nicotinoyl chloride in 100 parts by volume of anhydrous pyridine was allowed to stand at 5° C. for two days. Most of the pyridine was removed in vacuo and the residue shaken with 200 parts by volume of ethyl acetate and 40 parts by volume of 5% aqueous sodium hydroxide. The ethyl acetate phase was next shaken with 40 parts by volume of 5% aqueous hydrochloric acid, whereupon methyl reserpate nicotinate hydrochloride was formed in solution. The solution was basified with ammonia and the methyl reserpate nicotinate removed by filtration. It was recrystallized from acetone-water to yield the pure methyl reserpate nicotinate. M. P. 255–6° C. (with decomposition).

Analysis: Theory: C, 67.1; H, 6.4; N, 8.1. Found: C, 67.17; H, 6.23; N, 8.02. The empirical formula for the compound is: $C_{29}H_{33}N_3O_6$.

Example 21

A solution of 5 parts by weight of methyl reserpate in 100 parts by volume of anhydrous pyridine was shaken at room temperature with 6 parts by weight of cinnamoyl chloride for two days. Most of the anhydrous pyridine was removed in vacuo. 200 parts by volume of ethyl acetate and 40 parts by volume of 5% aqueous sodium hydroxide solution were added to the residue and on shaking the ester entered the ethyl acetate phase. The aqueous phase was separated and the ethyl acetate shaken with 40 parts by volume of 5% aqueous hydrochloric acid. This treatment removed any pyridine. The ethyl acetate was then washed with 40 parts by volume of 5% sodium hydroxide solution and concentrated to dryness. The residue was dissolved in 50 parts by volume of acetone and acidified to pH 3 with 8 N ethanolic hydrogen chloride. The addition of 200 parts by volume of ether precipitated the crude hydrochloride of the methyl reserpate cinnamate. It was filtered, washed with acetone and converted to the crystalline free base as follows: The hydrochloride was dissolved in 20 parts by volume of a warm 1:9 water-acetone mixture and basified with aqueous ammonia. On addition of water the crystalline methyl reserpate cinnamate separated. It was recrystallized from an acetone-water mixture, and melted at 240–243° C. (with decomposition).

Analysis: Theory: C, 70.6; N, 5.2; H, 6.6. Found: C, 70.53; N, 5.13; H, 6.58. The empirical formula for the compound is: $C_{32}H_{36}N_2O_6$.

Example 22

A solution of 0.4 part by weight of methyl reserpate and 0.5 part by volume of phenylacetyl chloride in 10 parts by volume of pyridine was allowed to stand at room temperature for six days. After addition of 25 parts by weight of ice to the solution, a precipitate of phenylacetic anhydride which formed was filtered off and the solution evaporated to dryness in vacuo, under nitrogen, on a water bath at 50° C. The residue was dissolved in 50 parts by volume of chloroform, and the chloroform solution was washed in succession, using 50 parts by volume each time, with three portions of 2% hydrochloric acid, three portions of 2% potassium hydroxide solution, one portion of 2% hydrochloric acid and one portion of water. After drying the chloroform solution over sodium sulfate, it was evaporated to dryness and the residue dissolved in 10 parts by volume of benzene. This was chromatographed on 10 parts by weight of Brockmann activity II–III alumina and the adsorbate eluted with approximately 50 parts by volume each of benzene, 90 benzene:10 acetone, 60 benzene:40 acetone, and acetone. From the last two eluates methyl reserpate phenylacetate, M. P. 235–239° C. was obtained by triturating with acetone.

Example 23

A solution of 0.5 part by weight of methyl reserpate and 2.0 parts by volume of 3,4-dichlorobenzoyl chloride in 15 parts by volume of pyridine was allowed to stand at room temperature for four days. After the addition of 25 parts by weight of ice, the solution was evaporated to dryness in vacuo, under nitrogen, on a water bath at 50° C. The residue was dissolved in 50 parts by volume of chloroform and the chloroform solution washed in succession, using 50 parts by volume each time, with three portions of 2% hydrochloric acid, three portions of 2% potassium hydroxide solution, one portion of 2% hydrochloric acid and one portion of water. After drying over sodium sulfate, the chloroform solution was evaporated to dryness. The residue was dissolved in 15 parts by volume of benzene and chromatographed on 10 parts by weight of Brockmann activity II–III alumina. Eluates of approximately 50 parts by volume each of benzene, 90 benzene:10 actone, 60 benzene:40 acetone and acetone were removed and evaporated to oily residues. From the last three eluates there was obtained methyl reserpate 3,4-dichlorobenzoate, M. P. 239–243° C., by triturating with acetone.

Example 24

A solution of 0.4 part by weight of methyl reserpate and 0.5 part by volume of isocaproyl chloride in 10 parts by volume of pyridine was allowed to stand at room temperature for six days. After addition of 25 parts by weight of ice, the solution was evaporated to dryness in vacuo, under nitrogen, on a water bath at 50° C. The residue was dissolved in 50 parts by volume of chloroform and washed in succession using 50 parts by volume each time, with three portions of 2% hydrochloric acid, three portions of 2% potassium hydroxide solution, one portion of 2% hydrochloric acid and one portion of water. After drying over sodium sulfate, the chloroform solution was evaporated to dryness in vacuo and the residue treated with 20 parts by volume of benzene. (A part of the residue was found to be insoluble in the benzene and after trituating with acetone was found to be methyl reserpate isocaproate, M. P. 225–226° C.) The benzene solution was chromatographed on 10 parts by weight of Brockmann activity II–III alumina. Eluates of approximately 50 parts by volume of benzene, 90 benzene:10 acetone, 60 benzene:40 acetone, and acetone were removed and evaporated to oily residues. From the last two eluates crystalline methyl reserpate isocaproate, M. P. 224–226° C. was obtained by trituating with acetone.

Example 25

A suspension of 0.9 part by weight of methyl reserpate in 10 parts by volume of acetic anhydride was heated on the steam bath for one hour and then allowed to stand at room temperature overnight. At the end of this time, the crystals which had formed were filtered and the filtrate concentrated in vacuo to one third its volume. Again the crystals were filtered and, when combined with the previous crop, yielded methyl reserpate acetate, M. P. 287–290° C. On recrystallization from acetone, the product melted at 296–298° C. Analysis: Theory: C, 65.7; N, 6.14; H, 7.05. Found: C, 65.65; N, 6.21; H, 7.04. The empirical formula for the compound is: $C_{25}H_{32}N_2O_6$.

Example 26

A solution of 0.25 part by weight of ethyl reserpate and 3 drops of concentrated sulfuric acid in 5 parts by volume of acetic anhydride was boiled for 5 minutes and then allowed to cool slowly to room temperature. The solution was diluted with 40 parts by volume of ether which precipitated a yellow powder. This was filtered, slurried with 25 parts by volume of 5% sodium carbonate solution and the mixture extracted with 30 parts by volume of chloroform. After drying over sodium sulfate, the chloroform was evaporated in vacuo. From the residue was obtained ethyl reserpate acetate, M. P. 245–250° C., by triturating with acetone.

*Example 27*

A solution of 0.5 part by weight of ethyl reserpate and 1.5 parts by weight of 3,4,5-trimethoxybenzoyl chloride in 15 parts by volume of pyridine was allowed to stand at room temperature for four days. After the addition of 25 parts by weight of ice, the solution was filtered to remove a precipitate of trimethoxybenzoic anhydride and evaporated to dryness in vacuo, under nitrogen, on a water bath at 50° C. The residue was dissolved in 50 parts by volume of chloroform and washed in succession, using 50 parts by volume each time, with three portions of 2% hydrochloric acid, three portions of 2% potassium hydroxide solution, one portion of 2% hydrochloric acid and one portion of water. After drying over sodium sulfate, the chloroform solution was evaporated to dryness. The residue was dissolved in 15 parts by volume of benzene and chromatographed on 10 parts by weight of Brockmann activity II–III alumina. Eluates of approximately 50 parts by volume each of benzene, 90 benzene:10 acetone, 60 benzene:40 acetone and acetone were removed and evaporated to oily residues. From the 60 benzene:40 acetone eluate ethyl reserpate 3,4,5-trimethoxy-benzoate, M. P. 218–220° C. was obtained, by triturating with acetone.

*Example 28*

To a solution of 0.75 part by weight of methyl reserpate in 7.5 parts by volume of pyridine were added 1.6 parts by weight of p-toluenesulfonyl chloride. The reaction mixture was allowed to stand at room temperature in the dark for three and one-half days. At the end of this time about 30 parts by volume of water was added with cooling and the thus formed oil was extracted with three 15 parts by volume portions of chloroform. The combined extracts were worked up with 10 parts by volume of 5% sodium hydroxide solution and then three times with 10 parts by volume of water. After drying, the solvent was removed in vacuo leaving a residue which crystallized upon the addition of a small amount of benzene. After recrystallization from ethanol, methyl reserpate p-toluenesulfonate, M. P. 221–222° C. was obtained. Analysis: Theory: C, 63.36; H, 6.38; N, 4.93; S, 5.64. Found: C, 63.68; H, 6.13; N, 4.72; S, 5.56. The empirical formula for the compound is: $C_{30}H_{36}N_2O_7S$.

It will be appreciated that other esters of alkyl reserpates than those illustrated by the above examples can be prepared in a similar manner. Thus, by esterifying ethyl reserpate with veratroyl chloride, anisoyl chloride, 2-furoyl chloride, nicotinoyl chloride, cinnamoyl chloride, phenylacetyl chloride, 3,4-dichlorobenzoyl chloride, isocaproyl chloride, and p-toluenesulfonyl chloride, by the same procedure as described in the above examples, the corresponding ethyl reserpate esters, namely ethyl reserpate veratrate, ethyl reserpate anisate, ethyl reserpate 2-furoate, ethyl reserpate nicontinate, ethyl reserpate cinnamate, ethyl reserpate phenylacetate, ethyl reserpate 3,4-dichlorobenzoate, ethyl reserpate isocaproate, and ethyl reserpate p-toluenesulfonate, may be obtained.

In addition to the esterifying agents illustrated by the examples, there may be employed for this purpose, the following acids, either in the form of the acids per se, their anhydrides, or halides, for example, aliphatic acids, such as propionic, chloropropionic, butyric, succinic, methylethyl acetic, methylethylglycolic, stearic, chlor-acetic, aminoalkanoic acid anhydrides and chlorides, aralíphatic acids, such as mandelic, tropic, alkoxy-substituted cinnamic acid, e. g. mono- and di-methoxy cinnamic acid; aromatic acids, e. g. o-methoxybenzoic, p-toluic, 3,4,5-trimethoxybenzoic, piperonylic, salicylic, p-hydroxybenzoic, protocatechuic, resorcylic, orsellinic, pyrogallic, vanillic, isovanillic, syringaic, 4-chlorobenzoic, p-nitrobenzoic, p-aminobenzoic, phthalic acid anhydrides and their chlorides; polycyclic acids, e. g. 1- and 2-naphthoic acid anhydrides and their chlorides; heterocyclic acids, e. g. thienoic, picolinic, isonicotinic, quinoline carboxylic acid anhydrides and their chlorides; and sulfonic acids; e. g. sulfanilic acid anhydrides and their chlorides.

The following examples will serve to illustrate the preparation of quaternary ammonium compounds.

*Example 29*

One half part by weight of methyl reserpate was dissolved in a solution of 5 parts by volume of methyl iodide in 20 parts by volume of acetone and allowed to stand at room temperature for 18 hours. At the end of this time a voluminous precipitate had formed. The mixture was evaporated to dryness several times from fresh acetone and the resulting yellow powder washed with acetone. The thus obtained methyl resperate methiodide was slightly hygroscopic. It melted with decomposition at 205–215° C.

*Example 30*

To 2 parts by weight of reserpine dissolved in 25 parts by volume of methylene chloride were added 25 parts by volume of methyl iodide. After standing for two days in the dark at room temperature, the solution was concentrated to one-fifth of its original volume. The solid was filtered off and recrystallized from hot methanol to yield reserpine monomethiodide, M. P. 265–266° C.

Quaternary ammonium derivatives of reserpic acid, and of other esters of reserpic acid can also be prepared in the same manner.

*Example 31*

2 parts by weight of methyl reserpate and 6.5 parts by weight of 3,4-methylenedioxybenzoyl chloride are dissolved in 25 parts by volume of dry pyridine and allowed to stand at 5° C. for two weeks. The semi-crystalline mixture is poured over an equal quantity of ice and the resulting solution evaporated almost to dryness in vacuo at 50° C. After repeated evaporation from chloroform, the residue is dissolved in 125 parts by volume of chloroform and washed with 2 percent aqueous sodium hydroxide and water. The chloroform is dried over sodium sulfate, evaporated in vacuo and the residue chromatographed in benzene on neutral alumina (Woelm, activity I). Benzene containing increasing amounts of methanol (0.5–5 percent) elutes a gum which crystallize from ethanol-methylene chloride. The thus obtained methyl reserpate 3,4-methylenedioxybenzoate melts at 235–239° C. Its IR-spectrum taken in Nujol (mineral oil) mull shows the following bands given in reciprocal centimeters: strong bands at 2893–2858, 1733, 1714, 1468, 1445, 1288, 1265, 1241, 1156, 1115, 1110, 1045, 762; medium bands at 3373, 1629, 1510, 1491, 1374, 1338, 1312, 1200, 1183, 1075, 922, 891; medium bands at 989, 978, 939, 880, 834, 826, 808, 788, 720; weak bands at 3076, 1575, 953, 863, 849; shoulders at 1610, 1363, 1330, 1227, 1215, 1035, 1016, 971, 744, 731.

The base may be converted into its salts, for example as follows: 20 mg. of methyl reserpate 3,4-methylenedioxybenzoate in 1.5 ml. of ethanol are treated with 3 drops of dilute nitric acid (1:5) yielding the crystalline nitric acid salt of methyl reserpate 3,4-methylenedioxybenzoate which after filtering, water washing and drying, melts at 231–234° C.

20 mg. of methyl reserpate 3,4-methylenedioxybenzoate in 1.5 ml. of 20 percent acetic acid are treated with excess solid oxalic acid. The gelatinous precipitate which forms immediately is transformed to a grainy white powder by warming and triturating on the steam bath. It is filtered, washed with a few drops of 10 percent acetic acid and with ether. The thus obtained oxalic acid salt of methyl reserpate 3,4-methylenedioxybenzoate melts after drying at 238–240° C.

For therapeutical use the new pharmacologically active compounds, for example methyl reserpate veratrate, methyl reserpate anisate, methyl reserpate furoate, methyl reserpate nicotinate, methyl reserpate cinnamate, methyl reserpate acetate, and ethyl reserpate 3,4,5-trimethoxybenzoate and especially the very active methyl reserpate 3,4-methylenedioxybenzoate may be made up into pharmaceutical compositions which comprise them together with a pharmaceutical adjuvant as a carrier. The compositions thus provided by the invention may be in any suitable solid or liquid dosage form especially in a form suitable for oral or parenteral administration, e. g. tablets, powder, capsules, pills, solutions, emulsions or suspensions, e. g. in the form of ampouled injectable solutions. As pharmaceutical carriers there may be employed materials or mixtures of such which do not react with the new compounds and are therapeutically useful. Substances or mixtures thereof, such as water, gelatine, lactose, starch, magnesium stearate, talc, vegetable oils, benzyl alcohol, ascorbic acid, gums, glycols such as propylene glycol or polyalkylene glycol, petroleum jelly, cholesterol, tragacanth, alcohol or others may be employed. The new compositions contain a therapeutically effective amount of the new compounds per dosage unit, such as for example about 0.1–50 parts by weight, advantageously 0.1–10 parts by weight of methyl reserpate 3,4-methylenedioxybenzoate. In preparing the novel compositions the new compounds are admixed with the pharmaceutical carrier and formulated in the desired dosage unit form according to pharmaceutical practice. The compositions may be sterilized and may contain auxiliary substances such as preservative, stabilizing, wetting or emulsifying substances, salts for the control of the osmotic pressure or buffer substances or besides the new compounds other therapeutically active substances, for example such as are used in combination with reserpine.

As therapeutically active substances which may be present in the compositions, there may be mentioned other hypotensive active substances, such as ganglionic blockers, e. g. N,N,N′,N′-3-pentamethyl-N,N′-diethyl-3-azapentylene-1,5-diammonium dibromide, hexamethylene bis-trimethyl-ammonium bromide, pentamethylene bis-methyl-pyrrolidinium ditartrate or 2-(2′-dimethyl-aminoethyl)-4,5,6,7-tetrachloroisoindoline dimethochloride, which can be obtained according to copending application Serial No. 473,431, filed December 6, 1954, now abandoned, of Charles Ferdinand Huebner; adrenergic blockers, e. g. 2 - (N′ - p - tolyl - N′ - m - hydroxyphenyl - aminomethyl)-imidazoline or active derivatives of ergot alkaloids; hydrazino-pyridazines, e. g. 1,4-dihydrazino-phthalazine or 1-hydrazino-phthalazine; deserpidine or analogues of deserpidine, e. g. 3,4,5-trimethoxy-cinnamoyl methyl deserpidate, which are described in copending application Serial No. 471,519, filed November 26, 1954, of Paul Reuben Ulshafer. There may also be mentioned other sedative active substances such as barbiturates, 3-ethyl-3 - phenyl - 2,6 - dioxo - piperidine, N - (3′ - dimethyl-aminopropyl)-3-chloro-phenthiazine; central nervous stimulants, such as methyl α-piperidyl-(2)-phenyl acetate or dl-α-methyl-phenylethylamine; cholinergic blocking agents such as diethylamino-ethyl α-cyclohexyl-α-phenyl-α-hydroxy acetate methobromide, atropine or diethylamino-ethyl 9-xanthene-carboxylate methobromide; or antihistaminics such as 2 - [benzyl - (2′ - dimethylaminoethyl)-amino]-pyridine.

Methyl reserpate 3,4-methylenedioxybenzoate may be made up, for example into the following compositions:

|  | Mg. |
|---|---|
| 1. Methyl reserpate 3,4-methylenedioxybenzoate | 0.1 |
| 2. Lactose | 53.4 |
| 3. Gelatine | 1.0 |
| 4. Starch | 40.0 |
| 5. Magnesium stearate | 0.3 |
| 6. Talcum | 5.2 |
|  | 100.0 |

| 1. Methyl reserpate 3,4-methylenedioxybenzoate | mg | 1.0 |
|---|---|---|
| 2. Ethanol | cc | 0.25 |
| 3. Propylene glycol | cc | 0.25 |
| 4. Water | cc | 0.5 |
|  | cc | 1.0 |

In making the tablet, a homogeneous mixture is prepared from 1 and 2, a paste is made with 3 and part of 4. The paste is mixed with 1 and 2 and the remainder of 4 to form a moist homogeneous mass which is then granulated and dried. After this, 5 and 6 are added and the product tableted.

|  | G. |
|---|---|
| 1. Methyl reserpate 3,4-methylenedioxybenzoate | 0.50 |
| 2. Tragacanth BC | 3.00 |
| 3. Lactose | 134.50 |
| 4. Corn starch | 3.75 |
| 5. Talcum | 7.50 |
| 6. Magnesium stearate | 0.75 |
|  | 150.00 |

The methyl reserpate 3,4-methylenedioxybenzoate and tragacanth are mixed together and then mixed with the lactose. The resulting mixture is granulated with 3A alcohol 50 percent and passed through a No. 10 screen. It is then dried thoroughly and passed through a No. 16 screen. The granulation is then mixed with the talcum, corn starch and magnesium stearate and the resulting granulation after rescreening tableted into tablets of 150 mg. weight each.

| 1. Methyl reserpate 3,4-methylenedioxybenzoate | g | 0.125 |
|---|---|---|
| 2. Citric acid, anhydrous | g | 0.125 |
| 3. Benzyl alcohol | g | 1.000 |
| 4. Polyethylene glycol 300 special | ml | 5.000 |
| 5. Water for injection to make 50,000 ml. of solution. | | |

This preparation for injection is obtained by dissolving the methyl reserpate 3,4-methylenedioxybenzoate in the benzyl alcohol, and adding the solution of the citric acid in 1 part of volume of water for injection. After mixing, the polyethylene glycol is added and the whole mixed well. Water for injection is slowly added to make up a 50 parts by volume solution, which is then filtered through a coarse porosity sintered glass funnel.

What is claimed is:
1. Reserpic acid alkyl esters with a free hydroxyl group.
2. Salts of the compounds of claim 1.
3. Reserpic acid methyl ester.
4. Salts of reserpic acid methyl ester.
5. Reserpic acid ethyl ester.
6. Salts of reserpic acid ethyl ester.
7. Reserpic acid.
8. Salts of reserpic acid.
9. A process for preparing reserpic acid which comprises the step of treating reserpine with an alkali metal hydroxide in a lower alkanol.
10. A process for preparing a lower alkyl reserpate which comprises the step of treating reserpic acid with a lower diazoalkane.
11. A process for preparing methyl reserpate which comprises the step of treating reserpic acid with diazomethane.

References Cited in the file of this patent

Helv. Chim. Acta (Dorfman et al.), vol. 37, pp. 59–75 (1954).

U. S. DEPARTMENT OF COMMERCE
PATENT OFFICE

CERTIFICATE OF CORRECTION

Patent No. 2,824,874     Emil Schlittler           February 25, 1958

It is hereby certified that error appears in the printed specification of the above numbered patent requiring correction and that the said Letters Patent should read as corrected below.

Column 4, line 70, for "maxima" read -- minima --; column 8, line 73, for "reseapate" read -- reserpate --; column 13, line 63, for "nicontinate" read -- nicotinate --; column 16, line 43, for "g - - 1.000" read -- ml -- 1.000 --.

Signed and sealed this 24th day of June 1958.

(SEAL)
Attest:

KARL H. AXLINE
Attesting Officer

ROBERT C. WATSON
Commissioner of Patents